March 16, 1965 J. J. HAGOPIAN ETAL 3,174,140

MAGNETO-OPTICAL RECORDING AND READOUT DEVICE

Filed July 1, 1959

INVENTORS
JACOB J. HAGOPIAN
EDWARD J. SUPERNOWICZ
BY Walter J. Madden Jr.
ATTORNEY United States Patent Office
3,174,140
Patented Mar. 16, 1965

3,174,140
MAGNETO-OPTICAL RECORDING AND READOUT DEVICE

Jacob J. Hagopian and Edward J. Supernowicz, Santa Clara County, Calif., assignors to International Business Machines Corporation, New York, N.Y., a corporation of New York Filed July 1, 1959, Ser. No. 824,347
9 Claims. (Cl. 340—174.1)

Figures 1, 2:
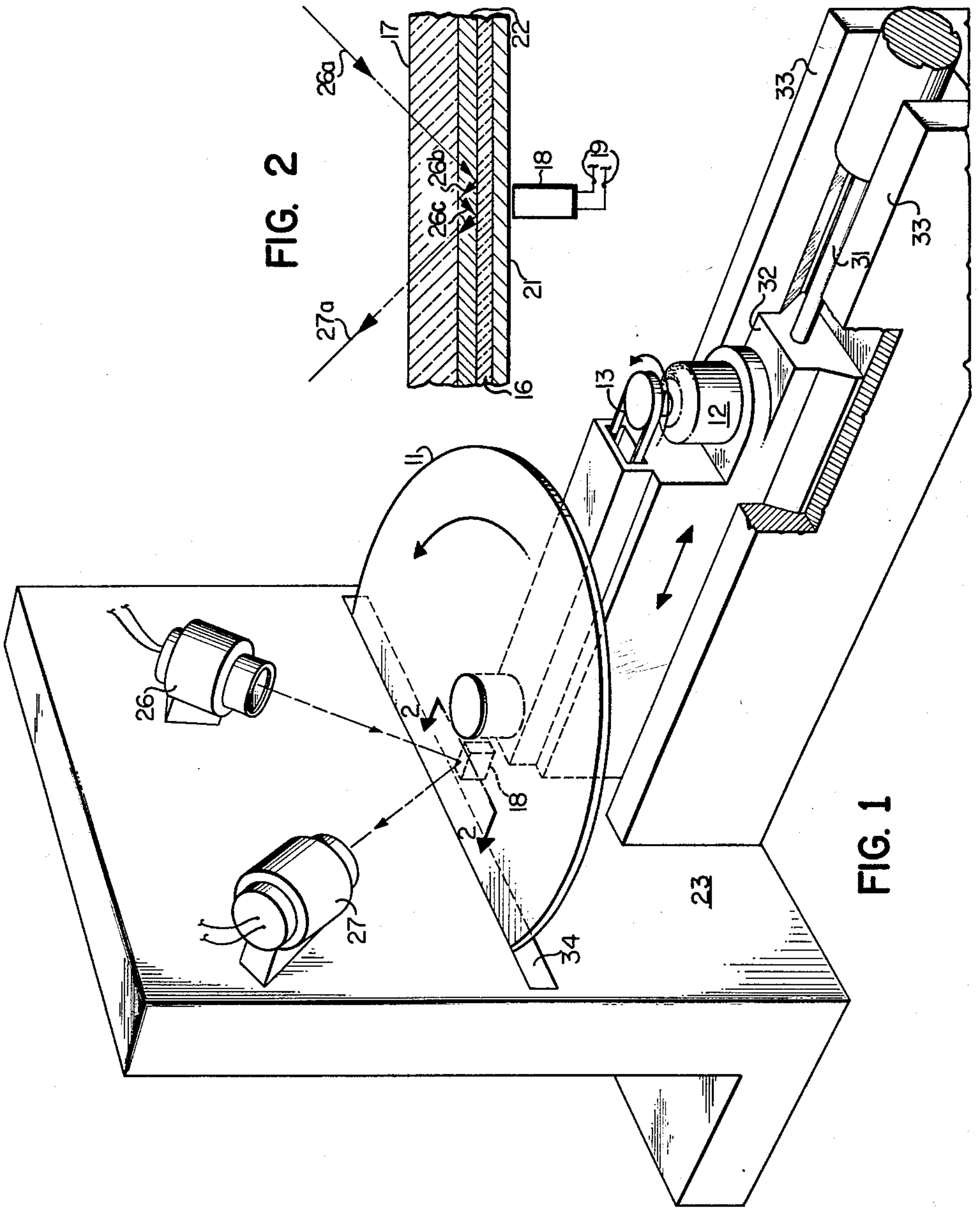

This invention relates in general to magnetic recording devices and relates more particularly to such devices employing magnetic recording and optical reproducing of the recorded information.

There are numerous techniques in the art of magnetic recording for recording at extremely high bit densities. One such technique involves the use of domain-oriented probe-type magnetic recording heads which produce a magnetized spot or bit occupying an extremely small area on the recording surface, thus permitting the recording of a large number of such bits on a given area. However, there is not available a corresponding magnetic reproduction technique having the resolution necessary to accurately and rapidly read out the bits recorded at such high densities.

Broadly, the present invention contemplates a recording system utilizing magnetic means for recording at high bit densities on a magnetic medium, together with optical means for reproducing the recorded information. The optical reading means of the present invention utilize the Kerr magneto-optical effect to detect the presence of magnetic recording on different portions of the recording medium. As is well known, the Kerr magneto-optical effect is exhibited by a magnetic surface which is illuminated by a beam of polarized light. The plane of polarization of the beam reflected from the magnetic surface is rotated if a magnetic field is present on the portion of the magnetic surface from which the polarized beam was reflected. That is, when the polarized beam is reflected from a portion of the magnetizable surface having a magnetic bit thereon, the plane of polarization of the reflected beam is rotated, while no rotation of the plane of polarization of the reflected beam occurs for those areas of the surface on which no magnetic bit is present. Thus, the occurrence of rotation of the plane of polarization, as detected by a crossed analyzer or the like, is a measure of the presence or absence of a magnetic bit on the point of the magnetizable surface from which the polarized light beam is reflected.

As is well known in the art, the Kerr magneto-optical effect is exhibited in connection with magnetization which is normal to the reflecting surface, magnetization which is parallel to the reflecting surface and in the plane of incidence, and magnetization in the surface which is normal to the plane of incidence of the polarized light. Any of these Kerr magneto-optical effects may be utilized in the present invention, the selection of a particular one of the effects being dependent upon the nature of the magnetic recording material utilized and the type of recording to be applied to this material.

In accordance with the present invention, the recording medium is preferably in the form of a rotating disk having a magnetizable material on one surface on which high density magnetic recording is performed by suitable means such as a domain-oriented probe-type magnetic head. The disk is transparent and is provided on the surface opposite to the magnetizable film with apparatus for magneto-optically sensing the magnetic bits utilizing the Kerr magneto-optical effect. Such apparatus includes a source of polarized light for projecting a narrow beam of polarized light at the disc surface, and a crossed analyzer for detecting whether the plane of polarization of the beam of polarized light reflected from the disk has been rotated. By thus providing recording means on one side of the disk and reproducing or reading means on the opposite side of the disk, it is possible to both read and write at the same point on the surface, thus facilitating the transfer of information to and from the disk surface. It will be appreciated that where the writing is performed at one point on the disk surface and reading is performed at a different point, some type of compensating apparatus must be utilized to properly synchronize the reading and writing operations to take into account the different physical locations of the reading and writing apparatus.

Preferably, the magnetizable layer is coated with a ceramic alumina underlay and overlay to provide mechanical protection for the magnetic surface and to enhance the optical rotation of the polarized light beam. This enhancement of the optical rotation, as a result of the use of the ceramic alumina underlay and overlay, is believed to be produced by the multiple reflecting of the polarized light between the underlay and overlay prior to reflection of the beam toward the crossed analyzer.

The magnetic data may be recorded in any suitable pattern on the disk surface, but it is preferably recorded in the form of concentric circles, each of the circles constituting a track containing any number of magnetic bits. To obtain access to the different tracks, the reading and writing elements may be positionable to different locations radially of the disk, but preferably the reading and writing elements are fixed in position and the disk itself is movable relative to these elements to position different ones of the recording tracks at the read-write station.

It is therefore an object of the present invention to provide an improved magneto-optical data recording system.

It is a further object of the present invention to provide an improved recording system in which data is recorded on a magnetizable medium and is reproduced therefrom by means of optical sensing utilizing the Kerr magneto-optical effect.

It is an additional object of the present invention to provide a recording device in which data is recorded on the magnetizable surface of a rotating disk and is reproduced therefrom by optical means utilizing the Kerr magneto-optical effect.

It is a further object of the present invention to provide a recording system in which data is recorded on a magnetizable surface on one side of the transparent rotating disk and is reproduced therefrom through the transparent disk by optical means utilizing the Kerr magneto-optical effect.

It is an additional object of the present invention to provide a recording device utilizing a magnetic recording element disposed at a read-write station on one surface of a rotating disk for magnetically recording on the disk and utilizing optical means disposed at the read-write station on the opposite side of the disk for reproducing the recorded information.

The foregoing and other objects, features and advantages of the invention will be apparent from the following more particular description of a preferred embodiment of the invention, as illustrated in the accompanying drawings.

FIG. 1 is a perspective view illustrating one embodiment of a recording device in accordance with the present invention; and FIG. 2 is a sectional view taken along plane 2—2 of FIG. 1 illustrating the preferred construction of the recording disk of the present invention.

Referring to FIG. 1 by character of reference, the recording device includes a disk member 11 which is rotated to pass different portions of the disk surface adjacent the reading and writing elements of the device. Disk 11 may be rotated by any suitable means such as by a motor 12 and a belt 13. As best shown in FIG. 2, disk 11 comprises a layer of magnetizable material 16 which is disposed adjacent a transparent member 17 such as glass. Magnetizable material 16 forms the recording surface on which the data is magnetically recorded by any suitable recording means such a domain-oriented probe-type magnetic recording head 18. Recording head 18 is connected by means shown schematically as conductors 19 to a source of information signals which are to be recorded on magnetizable layer 16.

The disk assembly is preferably provided with ceramic alumina underlay and overlay layers 21 and 22. In the illustrated embodiment alumina layer 22 is disposed adjacent transparent member 17, and the magnetizable recording member 16 is secured to layer 22, while layer 21 is disposed on the outside of magnetizable coating 16. Layer 21 provides mechanical protection for the magnetic surface 16, while transparent layer 22 functions to enhance the optical rotation of the polarized light beam, as will be discussed more in detail below.

The ceramic alumina overlayer and underlayer 21 and 22 may be of any suitable type, such as the alumina marketed under the trade designation "AL-300" by the Western Gold and Platinum Company. This particular variety of alumina contains 97.6 aluminum oxide and is a suitable transparent overlayer and underlayer for the purposes of the present invention. The alumina underlayer and overlayer may be deposited by any suitable known method, such as by the electron beam vapor deposition technique. In connection with the present invention, this electron beam vapor deposition technique was utilized to deposit a thin film of ceramic alumina of a thickness of approximately 500 Angstroms on a transparent base member.

Referring again to FIG. 1, recording head 18 is disposed at a fixed location on a base member 23 which serves as a support for the recording and reproducing elements. Recording head 18 is disposed on the underside of disk 11, while the reproducing elements including a source of polarized light 26 and a crossed analyzer 27 are mounted on base 23 above the disk. Light from source 26 is projected through a slit and a magnifying system (not shown) toward disk 11 and passed through transparent member 17 so as to strike magnetic surface 16 at a point immediately above recording head 18. As will be clearly seen by the arrows, the polarized light from source 26 is reflected from this point toward the crossed analyzer 27. By means of the slit and the optical magnifying system, the field of view of the polarized apparatus may be restricted to a single bit at a time on the surface of disk 11.

When a magnetic bit is present at the point on disk 11 on which the polarized beam from source 26 falls, the plane of polarization of the reflected beam will be rotated as a result of the Kerr magneto-optical effect, and this rotation is sensed by the crossed analyzer 27. Thus, as each bit space on the rotating magnetic surface passes under the reproducing station represented by the point of impingement of the beam of polarized light from source 26, the plane of polarization of the reflected light will either be rotated or not rotated depending upon whether a magnetic bit is present or not present at that spot, and this rotation or lack of rotation is detected by crossed analyzer 27. Analyzer 27 and its associated circuits will thus produce an output pulse train corresponding to the train of bits passing under the reading station.

As indicated above, ceramic layer 21 on the outer surface of magnetic material 16 provides mechanical protection for the magnetic surface and layer 22 acts to enhance the optical rotation of the beam of polarized light. This enhancement of the optical rotation is believed to be caused by the multiple reflection of the beam of polarized light within layer 22. This is shown diagrammatically in FIG. 2 where arrow **26*a* represents the path of the polarized light beam from source 26 toward disc 11. The polarized beam passes through transparent members 17 and 22 and is reflected from magnetic surface 16. If a magnetic field is present on surface 16** at the point of impingement of the polarized beam, the plane of polarization of the reflected beam will be rotated in accordance with the Kerr magneto-optical effect.

The reflected beam, following a path such as **26*b*, may then be reflected from the upper surface of layer 22 so as to be directed along a path 26*c* back toward magnetic surface 16. In FIG. 2, the paths shown are exaggerated for the sake of clarity, but it will be understood that the internally reflected polarized beam returning to surface 16 along a path such as 26*c* will again strike surface 16 at or closely adjacent the original point so as to again come under the magnetic influence of the magnetic bit recorded on this point. The polarized beam will thus undergo an additional rotation of its plane of polarization if there is a magnetic bit recorded at this point. The additional rotated polarized beam may then be further internally reflected within layer 22, or may follow a path such as 27*a* to a crossed analyzer 27. In either case, it will be seen that the internal reflection of the polarized beam within layer 22 enhances the rotation of the plane of polarization by virtue of the repeated exposure of the beam to the magnetic influence of a given bit, thus rendering detection of this rotation by analyzer 27** more certain.

To provide access to different ones of the record tracks on disk 11, the disk is preferably movable to cause the different tracks to move under the read-write station. Such movement of the disk may be accomplished by any suitable means, such as a piston adder mechanism as disclosed in copending application, Serial No. 748,213, now Patent No. 2,974,492, filed July 14, 1958, assigned to the same assignee as the present application. By means of such a mechanism, selective increments of mechanical motion may be imparted to a shaft 31 which is connected to a mounting block 32 on which are mounted the disk and the drive means therefor. Block 32 is movable in ways formed by opposite walls 33 of a guide channel, while disk 11 extends through an opening 34 in base 23 to permit different ones of the recording tracks to be positioned at the read-write station. It will be seen that by selectively controlling the movement of shaft 31, mounting block 32 will move in guideways 33 to move disk 11 through slit 34 to selectively position the desired recording track at the read-write station.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for storing information comprising a rotating disk having a magnetizable layer on one surface thereof, means disposed adjacent said one surface for magnetically recording at a point on said magnetizable layer, a source of polarized light disposed adjacent the opposite surface of said disk, said disk being transparent between said opposite surface and said magnetizable layer, means for projecting said light in a narrow beam at the same point on said opposite surface at which said magnetic recording occurred so that said beam undergoes a rotation of its plane of polarization in response to the presence of a magnetic field at said point, said point being immediately opposite said magnetic recording means, and analyzer means responsive to the reflected beam from said opposite surface for detecting the rotation of said plane of polarization as a measure of the presence of a magnetic field at said point.

2. Apparataus for storing information comprising a transparent rotating disk, a transparent ceramic layer on one surface of said disk, a magnetizable layer disposed on said ceramic layer, means disposed adjacent said one surface for magnetically recording at a point on said magnetizable layer, a source of polarized light disposed adjacent the opposite surface of said disk, said disk structure being transparent between said opposite surface and said magnetizable layer, means for projecting said light in a narrow beam through said disk and said ceramic layer to said point on the same magnetizable layer so that said beam undergoes a rotation of its plane of polarization in response to the presence of a magnetic field at said point, and analyzer means responsive to the reflected beam from said magnetizable layer for detecting the rotation of said plane of polarization as a measure of the presence of a magnetic field at said point.

3. Apparatus for storing information comprising a transparent rotating disk, a transparent ceramic layer on one surface of said disk, a magnetizable layer disposed on said ceramic layer, means disposed adjacent said one surface for magnetically recording at a point on said magnetizable layer, a source of polarized light disposed adjacent the opposite surface of said disk, said disk structure being transparent between said opposite surface and said magnetizable layer, means for projecting said light in a narrow beam through said disk and said ceramic layer to the same point on said magnetizable layer so that said beam undergoes a rotation of its plane of polarization in response to the presence of a magnetic field at said point, analyzer means responsive to the reflected beam from said magnetizable layer for detecting the rotation of said plane of polarization as a measure of the presence of a magnetic field at said point, and means for moving said disk relative to said magnetic recording means and said light source for positioning different portions of said disk at said point.

4. Apparatus for storing information comprising a transparent rotating disk, a first transparent ceramic layer on one surface of said disk, a magnetizable layer disposed on said first ceramic layer, a second ceramic layer disposed over said magnetizable layer, means disposed adjacent said one surface for magnetically recording at a point on said magnetizable layer, a source of polarized light disposed adjacent the opposite surface of said disk, said disk structure being transparent between said opposite surface and said magnetizable layer, means for projecting said light in a narrow beam through said disk and said first ceramic layer to the same point on said magnetizable layer at which said magnetic recording occurred so that said beam undergoes a rotation of its plane of polarization in response to the presence of a magnetic field at said point, and analyzer means responsive to the reflected beam from said magnetizable layer for detecting the rotation of said plane of polarization as a measure of the presence of a magnetic field at said point.

5. An out-of-contact system for recording and reproducing high density digital data comprising in combination: a movable record member composed of a nonmagnetic substrate having a thin film record surface of ferromagnetic material coated thereon, the thickness of said film being chosen sufficiently thin in conjunction with the ferromagnetic material of which it is comprised so as to provide a substantially rectangular hysteresis characteristic for magnetically storing a series of high density high and low level binary signal currents of digital data; a magnetic record head disposed in close proximity to said thin film record surface, said record head being responsive to said binary signal currents for magnetically recording said digital data as the record surface passes under said record head to produce a high density magnetic recording of digital data in said record surface; and optical reproducing means for reproducing digital data magnetically recorded in said thin film record surface by said magnetic record head comprising, means for producing a polarized beam of light and focusing said beam of light onto predetermined portions of said record surface so that the polarization of the beam of light is responsive to the digital data recorded in said record surface, and means including analyzer means for detecting changes in the polarization of said light beam to reproduce said high and low level binary signal currents of digital data.

6. A system for recording and reproducing digital data comprising in combination:

- a movable record member having a record surface of ferromagnetic material for storing binary signals therein,
- a magnetic record head responsive to said binary signals and disposed in close proximity to said record surface for magnetizing said record surface according to said binary signals,
- means for reproducing binary signals magnetically recorded in said record surface including means for producing a beam of polarized light and means for focusing said beam of light onto predetermined areas of said record surface, said beam of light being responsive to the magnetization of each predetermined area onto which it is directed so that the polarization of the light beam is rotated in accordance with the binary signals recorded in said predetermined areas, and
- means for detecting the rotation of the polarization of said light beam to produce electrical signals corresponding to the binary signals recorded in said predetermined areas.

7. A system for recording and reproducing high density digital data comprising:

- a movable record member having a thin film record surface of ferromagnetic material provided thereon, said thin film record surface having a thickness not exceeding 1,000 angstroms,
- a magnetic recording head disposed in close proximity to said record surface for magnetically recording digital data in predetermined areas of said surface, the direction of magnetization of recording being substantially parallel to said surface,
- a source of polarized light,
- means for directing the light onto predetermined areas of said surface so that the polarization of the reflected light from said surface varies in accordance with the digital data recorded therein as a result of the Kerr magneto-optical effect,
- means for sensing the variations in the polarization of said reflected light as said predetermined areas are scanned, and
- means coupled to the output of said last-mentioned means for producing digital electrical signals in response to the variations in the polarization of said reflected light.

8. A system for recording and reproducing digital data comprising in combination:

- a movable record member having a thin film record surface of ferromagnetic material for storing binary signals therein, said thin film record surface having a thickness not exceeding 1,000 angstroms,
- a magnetic record head responsive to said binary signals and disposed in close proximity to said record surface for magnetizing said record surface according to said binary signals,
- means for reproducing binary signals magnetically recorded in said record surface including means for producing a beam of polarized light and means for focusing said beam of light onto predetermined areas of said record surface, said beam of light being responsive to the magnetization of each predetermined area onto which it is directed so that the polarization of the light beam is rotated in accordance with the binary signals recorded in said predetermined areas, and means for detecting the rotation of the polarization of said light beam to produce electrical signals corresponding to the binary signals recorded in said predetermined areas.

9. A system for recording and reproducing data comprising:

a movable record member having a thin film record surface of ferromagnetic material provided thereon, said thin film record surface having a thickness not exceeding 1,000 angstroms, a magnetic recording head disposed in close proximity to said record surface for magnetically recording data in predetermined portions thereof, means for directing a polarized light beam onto predetermined portions of said surface so that the polarization of the light beam after reaction with said record surface varies in accordance with the data recorded therein, means for sensing the variations in the polarization of the reacted light beam as said predetermined areas are scanned, and means coupled to the output of said last-mentioned means for producing electrical signals in response to the variations in the polarization of the reacted light beam.

References Cited in the file of this patent

UNITED STATES PATENTS

| | | |
|---|---|---|
| 2,528,973 | Radman | Nov. 7, 1950 |
| 2,807,737 | Wright | Sept. 24, 1957 |
| 2,901,737 | Stovall | Aug. 25, 1959 |

OTHER REFERENCES

"Magnetic Domains by the Longitudinal Kerr Effect," Physical Review, vol. 94, April 1, 1954. (Pages 52–56 relied on.)